(12) United States Patent
Baker et al.

(10) Patent No.: US 11,358,078 B2
(45) Date of Patent: Jun. 14, 2022

(54) CONDUCTIVE THREAD FOR VEHICLE MAINTENANCE

(71) Applicant: Honda Motor Co., Ltd., Tokyo (JP)

(72) Inventors: Alex W. Baker, Ostrander, OH (US); Jacob J. Olchovy, Marysville, OH (US); Michael A. Baumbarger, Marysville, OH (US); Kimberly R. Araki, Bellefontaine, OH (US); Zainab I Ali, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 32 days.

(21) Appl. No.: 16/672,036

(22) Filed: Nov. 1, 2019

(65) Prior Publication Data
US 2021/0129054 A1    May 6, 2021

(51) Int. Cl.
*B01D 35/06* (2006.01)
*B01D 35/00* (2006.01)
(Continued)

(52) U.S. Cl.
CPC ........... *B01D 35/06* (2013.01); *B01D 35/005* (2013.01); *B01D 35/143* (2013.01);
(Continued)

(58) Field of Classification Search
CPC .... B01D 35/06; B01D 35/005; B01D 35/143; B01D 35/00; B01D 2201/54;
(Continued)

(56) References Cited

U.S. PATENT DOCUMENTS

| | | | |
|---|---|---|---|
| 4,806,204 A | 2/1989 | Manfré et al. | |
| 5,433,772 A * | 7/1995 | Sikora | B03C 3/32 55/357 |

(Continued)

FOREIGN PATENT DOCUMENTS

| | | |
|---|---|---|
| CN | 201515714 | 6/2010 |
| CN | 101817291 A | 9/2010 |

(Continued)

OTHER PUBLICATIONS

Office Action of U.S. Appl. No. 16/672,012 dated Oct. 6, 2020, 20 pages.
(Continued)

*Primary Examiner* — Akash K Varma
(74) *Attorney, Agent, or Firm* — Rankin, Hill & Clark LLP (57) ABSTRACT

A filter includes filter medium that screens out impurities from a fluid, and a conductive thread contacting the filter medium. A power source provides electric current flowing through the conductive thread, which causes electrical phenomena that is detected by a sensor. A sensor detects the electrical phenomena resulting from the flow of electric current through the conductive thread. Buildup on impurities in the filter causes a change in the electrical phenomena, which change is detected by the sensor and indicates the level of impurities in the filter. An indicator is in communication with the sensor, and provides an alert that the filter should be replaced when the level of impurities exceeds a predetermined threshold.

15 Claims, 4 Drawing Sheets

(51) Int. Cl.
*B01D 35/143* (2006.01)
*D02G 3/44* (2006.01)

(52) U.S. Cl.
CPC ...... *B01D 2201/54* (2013.01); *B01D 2201/56* (2013.01); *D02G 3/441* (2013.01)

(58) Field of Classification Search
CPC .... B01D 2201/56; B01D 29/07; B01D 29/21; B01D 24/4876; B01D 46/008; B01D 46/00; B01D 46/0086; B01D 46/44; B01D 46/521; D02G 3/441
USPC .......................................................... 210/85
See application file for complete search history.

(56) References Cited

U.S. PATENT DOCUMENTS

| | | | |
|---|---|---|---|
| 5,624,132 | A | 4/1997 | Blackburn et al. |
| 5,678,854 | A | 10/1997 | Meister et al. |
| 5,971,432 | A | 10/1999 | Gagnon et al. |
| 5,996,807 | A | 12/1999 | Rumpf et al. |
| 6,478,858 | B2 | 11/2002 | Angermann et al. |
| 6,543,299 | B2 | 4/2003 | Taylor |
| 6,613,227 | B2 | 9/2003 | Rickie |
| 6,697,723 | B2 | 2/2004 | Olsen et al. |
| 6,964,370 | B1 | 11/2005 | Hagale et al. |
| 7,880,613 | B1 | 2/2011 | Maeng |
| 8,060,282 | B2 | 11/2011 | Breed |
| 8,729,505 | B2 | 5/2014 | Seibt |
| 9,631,589 | B2 | 4/2017 | Harp |
| 9,772,422 | B2 | 9/2017 | Hull et al. |
| 10,000,097 | B2 | 6/2018 | Kim et al. |
| 10,274,647 | B2 | 4/2019 | Seder et al. |
| 2001/0015131 | A1* | 8/2001 | Angermann ....... B01D 53/0415 95/90 |
| 2003/0122669 | A1* | 7/2003 | Filippov ........... B60R 21/01532 340/563 |
| 2003/0132156 | A1* | 7/2003 | Rickie ................ B01D 35/0273 210/416.4 |
| 2010/0160882 | A1 | 6/2010 | Lowe |
| 2011/0116967 | A1* | 5/2011 | Roy ..................... H05H 1/2406 422/22 |
| 2011/0221459 | A1 | 9/2011 | Uno et al. |
| 2011/0240751 | A1 | 10/2011 | Rauh et al. |
| 2014/0102984 | A1* | 4/2014 | Harp ................. B01D 67/0027 210/651 |
| 2014/0134387 | A1 | 5/2014 | Yamada et al. |
| 2014/0210603 | A1 | 7/2014 | Walser |
| 2015/0329041 | A1 | 11/2015 | Salter et al. |
| 2016/0010273 | A1 | 1/2016 | Ashayer-Soltani et al. |
| 2016/0278444 | A1 | 9/2016 | Jordan et al. |
| 2016/0379466 | A1 | 12/2016 | Payant et al. |
| 2018/0005766 | A1 | 1/2018 | Fairbanks et al. |
| 2018/0225988 | A1 | 8/2018 | Morgado |
| 2018/0307315 | A1 | 10/2018 | Gong et al. |
| 2018/0333756 | A1 | 11/2018 | Seder et al. |

FOREIGN PATENT DOCUMENTS

| | | |
|---|---|---|
| CN | 201624172 | 11/2010 |
| CN | 104389076 B | 3/2015 |
| CN | 205417544 U | 8/2016 |
| CN | 205462733 U | 8/2016 |
| CN | 106149134 A | 11/2016 |
| CN | 108032711 | 5/2018 |
| CN | 207523509 U | 6/2018 |
| CN | 207568736 U | 7/2018 |
| CN | 207583526 U | 7/2018 |
| CN | 208730904 U | 4/2019 |
| DE | 1 02008064006 | 10/2009 |
| DE | 102010023892 | 8/2011 |
| DE | 102014005403 A1 | 10/2014 |
| EP | 2163459 | 3/2010 |
| EP | 3287304 | 2/2018 |
| EP | 3475724 | 5/2019 |
| JP | 2013154667 | 8/2013 |
| KR | 20030026458 A | 4/2003 |
| KR | 1 01557245 | 10/2015 |
| KR | 101590557 B1 | 2/2016 |
| KR | 20170111499 A | 10/2017 |
| KR | 201 80019459 | 2/2018 |
| WO | WO2007004000 A1 | 1/2007 |
| WO | WO2018031476 | 2/2018 |

OTHER PUBLICATIONS

T. Dias, and R. Monaragal. "Development and analysis of novel electroluminescent yarns and fabrics for localized automotive interior illumination", SAGE Journals, vol. 82 issue: 11, pp. 1164-1176, Jan. 19, 2012. https://journals.sagepub.com/doi/abs/10.1177/0040517511420763?journalCode=trjc.

Notice of Allowance of U.S. Appl. No. 16/672,012 dated Jan. 27, 2021, 5 pages.

D. Bial, D. Kern, F. Alt, and A. Schmidt. "Enhancing outdoor navigation systems through vibrotactile feedback", CHI '11 Extended Abstracts on Human Factors in Computing Systems, Vancouver, BC, Canada, May 7-12, 2011 pp. 1273-1278. https://dl.acm.org/citation.cfm?doid=1979742.1979760.

F. Kiss, R. Boldt, B. Pfleging, and S. Schneegass. "Navigation Systems for Motorcyclists: Exploring WearableTactile Feedback for Route Guidance in the Real World", CHI 2018, Apr. 21-26, 2018, Montreal, QC, Canada. http://www.medien.ifi.lmu.de/pubdb/publications/pub/kiss2018motorcyclenavi/kiss2018motorcyclenavi.pdf.

F.A. Olsen. "Killing bacteria with electromagnetic fields". DTU Chemical Engineering. Jun. 23, 2017. https://www.kt.dtu.dk/english/about-us/news/2017/06/killing-bacteria-with-electromagnetic-fields1 ?id=a6007cba-7469-4a20-a339-f17c96a82424, Printed Feb. 11, 2020.

Nippon Tungsten Co., Ltd., "Ionized Wire for Air Cleaner", https://www.nittan.co.jp/en/tech/techinfo/ionized.html.

Office Action of U.S. Appl. No. 16/671,987 dated Aug. 3, 2021, 34 pages.

* cited by examiner

CONDUCTIVE THREAD FOR VEHICLE MAINTENANCE

BACKGROUND

Vehicles include consumable components, including oil and air filters, which require replacement before the end of their useful lives. An owner of such a vehicle typically is an individual that drives the vehicle every day and thus is able to monitor these filters, often with the help of onboard vehicle sensors and indicators, to determine if the filters need to be replaced due to the amount of impurities they have removed from the oil or air.

Autonomous vehicles may not be operated by the same individual every day, and thus consumable components therein may not be detected by an owner of the autonomous vehicle as needing replacement.

BRIEF DESCRIPTION

According to one aspect, a filter is provided for use with an associated system that is configured to monitor a level of impurities in the filter. The system includes a power source and a sensor. The filter includes filter medium that screens out the impurities from a fluid, and a conductive thread contacting the filter medium and electrically connected to the power source. The power source is configured to provide electric current flowing through the conductive thread. The sensor is configured to detect electrical phenomena resulting from the electric current flowing through the conductive thread. The impurities in the filter cause a change in the electrical phenomena, which change indicates the level of impurities in the filter.

According to another aspect, a system for monitoring a level of impurities in a filter, includes a power source, the filter, and a sensor. The filter includes filter medium for screening out impurities from a fluid, and a conductive thread electrically connected to the power source. The power source provides electric current flowing through the conductive thread. The sensor detects electrical phenomena resulting from the electric current flowing through the conductive thread. The impurities in the filter cause a change in electrical phenomena, which change indicates the level of impurities in the filter.

According to another aspect, a method of changing a first filter in a system with a second filter, includes receiving a signal from the system that the first filter should be replaced, and replacing the first filter with a second filter. The system includes a power source and a sensor. The first filter includes filter medium that screens out impurities from a fluid, and a conductive thread contacting the filter medium and electrically connected to the power source. The power source provides electric current flowing through the conductive thread. The sensor detects electrical phenomena produced by the electric current flowing through the conductive thread. The impurities in the filter cause a change in the electrical phenomena, which change indicates the level of impurities in the filter. The signal is generated in response to the change exceeding a predetermined threshold.

DETAILED DESCRIPTION

Referring to the figures, a system 2 includes a filter 4 for screening out impurities 6 from a fluid. The system 2 monitors a level of the impurities 6 in the filter 4 and may generate a signal 10 (e.g. an alert) indicating that the level of impurities 6 in the filter 4 is beyond a predetermined threshold. The system 2 includes a power source 8, the filter 4, a sensor 12, and an indicator 14 for generating the signal 10.

Figure 2:
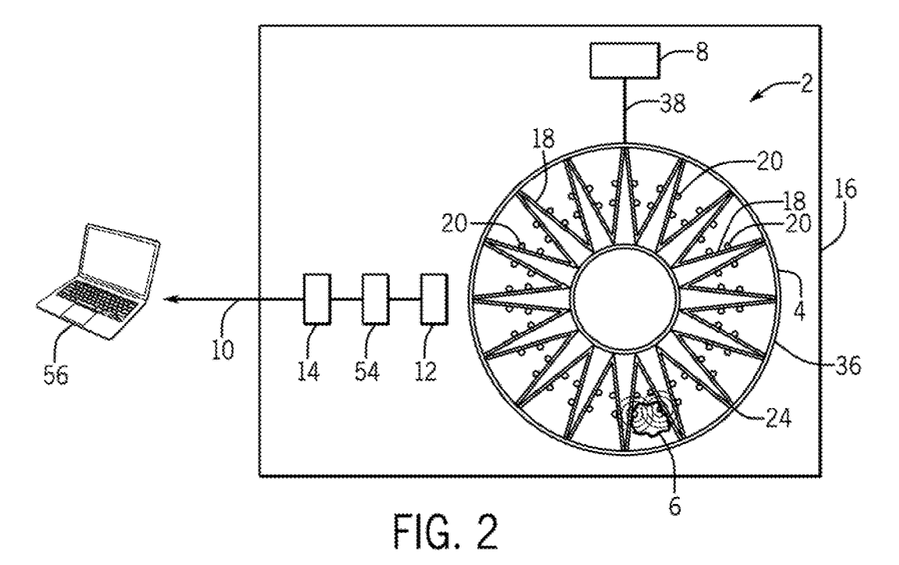
FIG. 2 is a schematic view of a vehicle including a filter according to the present subject matter.
Figure 3:
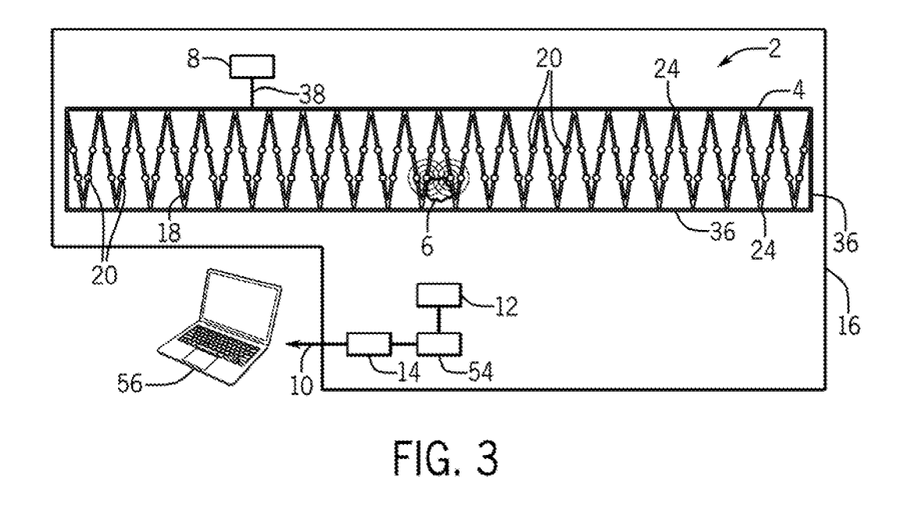
FIG. 3 is a schematic view of another vehicle including a filter according to the present subject matter.

The system 2 may be arranged in a vehicle, e.g. an autonomous vehicle 16 (shown schematically in FIGS. 2-3). The system 2 may be used for filtering out impurities 6 from a fluid associated with the autonomous vehicle 16. The autonomous vehicle 16 may be a ride-share vehicle, a taxi, a bus, or other types of vehicles. The fluid from which the impurities 6 are screened, may be air, engine oil, liquid coolant, water, or other fluid associated with the autonomous vehicle 16. The air may be outside air taken in to cool the engine or passenger compartment of the autonomous vehicle 16, or may be interior air circulated by the vehicle HVAC system. However, the system 2 is not limited to this use, and may be used in other applications such as HVAC and water filtration not associated with the autonomous vehicle 16.

The power source 8, sensor 12, and indicator 14 may be external to the filter 4, which means that they are separate and distinct from the filter 4; or they may be integral with the filter 4. In a non-limiting embodiment, the power source 8, sensor 12, and indicator 14 are external to the filter 4, and may be components of the autonomous vehicle 16 as shown in the figures.

The power source 8 provides electric current to the filter 4. The power source 8 may be a battery or alternator of the autonomous vehicle 16, or may be a battery included in the vehicle 16 so as to provide electric current exclusively to the filter 4.

The filter 4 includes a filter medium 18 for screening out the impurities 6 from the fluid, and an electrically conductive thread 20 arranged on the filter medium 18. The electric current provided by the power source 8 to the filter 4 flows through the conductive thread 20.

The filter medium 18 is not particularly limited, and may include any material that screens out impurities from a fluid, including but not limited to fibrous or porous material including paper, cotton, and spun fiberglass; woven and nonwoven textiles; polymers such as foamed polymers; screens or mesh such as stainless steel mesh; etc.

Figure 1A:
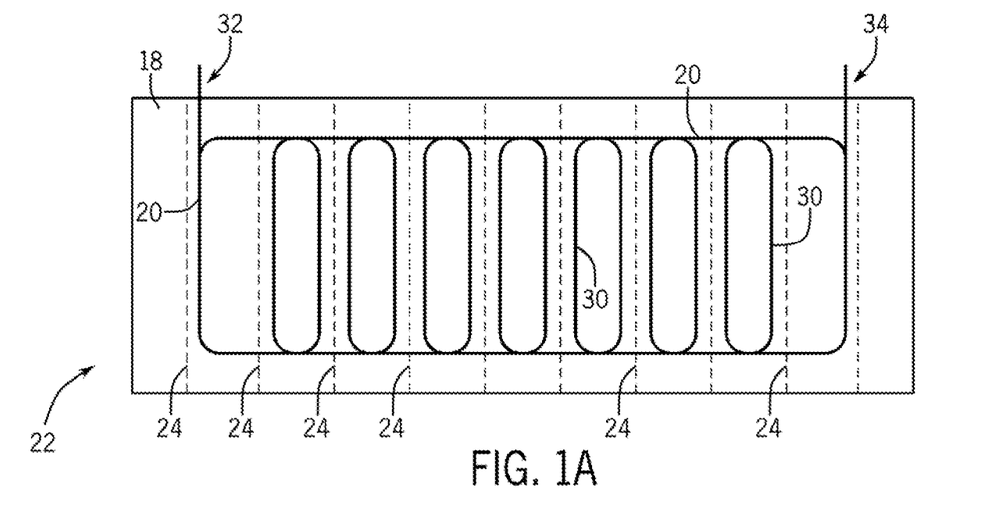
FIG. 1A is a plan view of filter medium and conductive thread in a non-folded state.
Figure 1B:
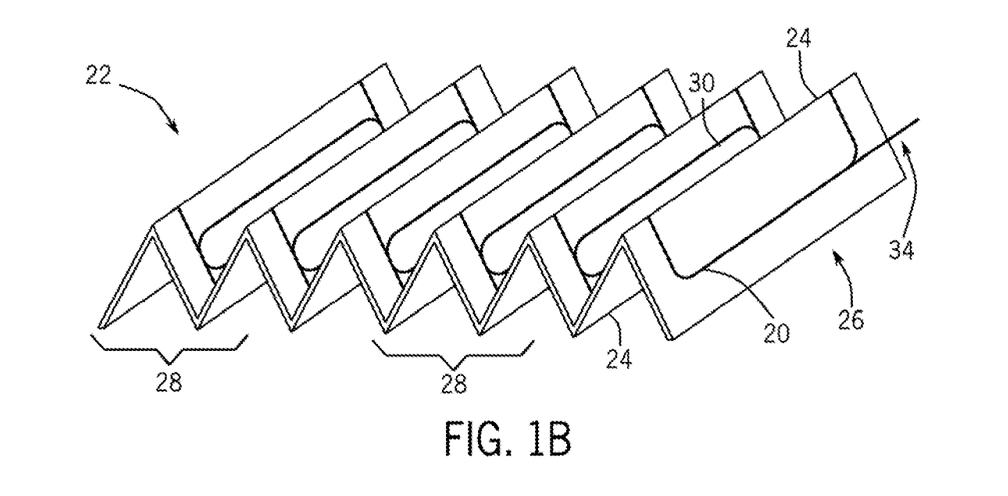
FIG. 1B is a perspective view of the filter medium and conductive thread in a folded state according to the present subject matter.

In a non-limiting embodiment (FIG. 1), the filter medium 18 is a flexible sheet-like structure 22, e.g. filter paper. The filter medium 18 along with the conductive thread 20, which is also flexible and thus may be bent or folded without a loss of continuity, may be folded/pleated along fold lines 24 in alternating directions to form a zig-zag shaped structure 26 including one or more Z-folds 28. The filter medium 18 and conductive thread 20 may be arranged in other configurations, including for example, tri-folds, gate folds, double parallel folds, rolling, bending, etc.

Figure 4:
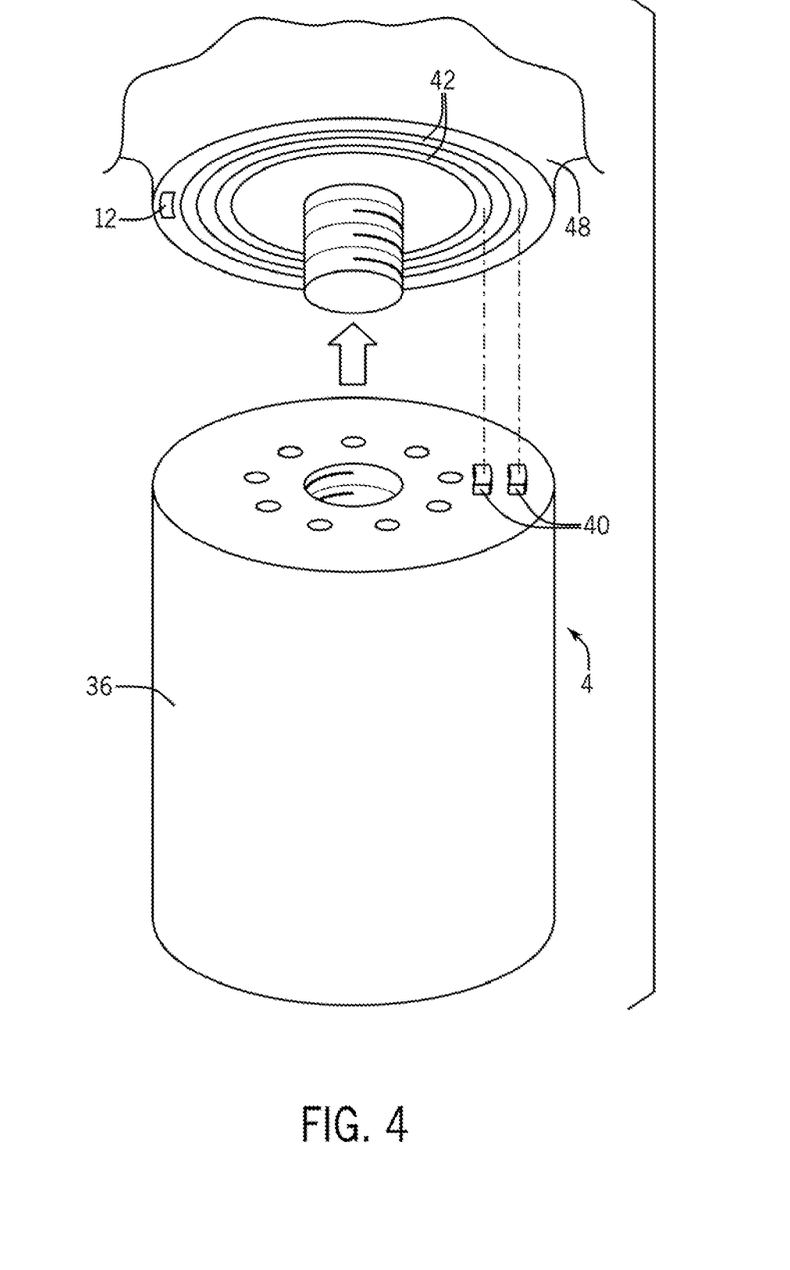
FIG. 4 is a perspective view of arranging a filter on a vehicle according to the present subject matter.
Figure 5:
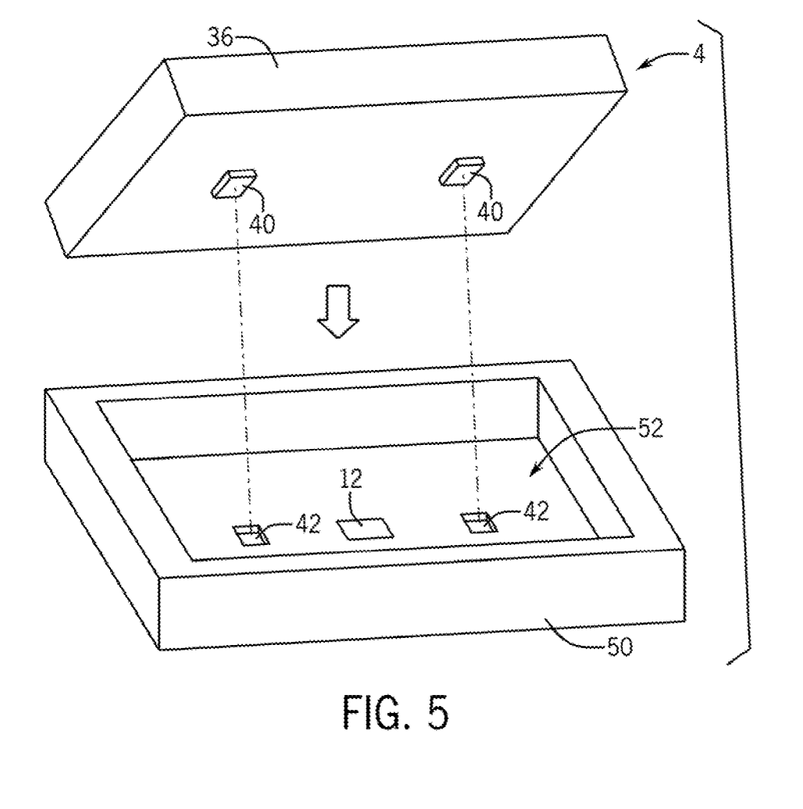
FIG. 5 is a perspective view of arranging another filter on a vehicle according to the present subject matter.

The zig-zag shaped structure 26, which includes the conductive thread 20 and filter medium 18, may be arranged in a self-contained housing 36 to provide a cartridge construction to the filter 4. However, this is not required and the filter medium 18 and conductive thread 20 may be used without a housing 36. As seen in FIG. 2 showing a cross section of the filter 4, the zig-zag shaped structure 26 may be rolled into a tube shape and arranged in a housing 36 in the shape of a hollow cylinder, to be used as an oil filter for example as seen in FIG. 4. As seen in FIG. 3 showing a cross section of the filter 4, the zig-zag shaped structure 26 may be maintained in a flat configuration and arranged in a housing 36 in the shape of a box, to be used as an air filter for example as shown in FIG. 5.

The conductive thread 20 is an elongated conductive material arranged on the filter medium 18. The conductive thread 20 is not particularly limited, and may include any one or more known conductive threads, including but not limited to a printed and cured conductive ink, a conductive polymer impregnated in or coated on a thread, a thin flexible conductive metal wire or braided cable, etc., or combinations thereof.

The conductive thread 20 may be arranged on a surface of the filter medium 18, for example by printing, adhesive application, or other techniques, and/or may be arranged within or inside the filter medium 18 (e.g. under an outer surface), for example by weaving, sewing, knitting, injection, mechanical mixing or other techniques.

The filter 4 may include one or more conductive threads 20 on the filter medium 18, and the conductive thread 20 may be arranged in a regular pattern or randomly on the filter medium 18. The conductive thread 20 may be arranged in a grid-like pattern, or may be arranged in other regular patterns.

In a non-limiting embodiment as depicted in FIG. 1, the filter medium 18 is a sheet-like structure 22 including a single continuous conductive thread 20 arranged in a regular pattern on a surface thereof. As depicted, the conductive thread 20 is arranged in a regular pattern including one or more coils 30. Each coil 30 may include one or more turns of the conductive thread 20. By including the coils 30, electric current flowing through the coils 30 may produce a magnetic field by induction. In this embodiment, the conductive thread 20 may be flexible, so that after the filter medium 18 is folded into the zig-zag structure 26, the conductive thread 20 maintains its electrical continuity from one end 32 to the other end 34 so that the electric current from the power source 8 can flow through the conductive thread 20 from the one end 32 to the other end 34.

The zig-zag structure 26 may be arranged inside a housing 36 of the filter 4. In a non-limiting embodiment, the filter 4 is an oil filter (FIGS. 2 and 4). In another non-limiting embodiment, the filter is an air filter (FIGS. 3 and 5). The zig-zag structure 26 including the filter medium 18 and the conductive thread 20 may be used in other types of filters and arrangements.

The system 2 may include an electrical connection 38 (see FIGS. 2-3) provided between the power source 8 and the filter 4 for transferring the electric current from the power source 8 to the conductive thread 20. For this purpose, the filter 4 may include one or more electrical contacts 40 on the housing 36 for making the electrical connection 38 and transferring the electric current to the conductive thread 20. These electrical contacts 40 may be attached to the two ends 32, 34 of the conductive thread 20. The vehicle 16 may include corresponding electrical contacts 42 that are in electrical communication with the power source 8 and are for mating with, and electrically connecting with, the electrical contacts 40 of the filter 4 for allowing the transfer of electric current from the power source 8 to the conductive thread 20.

The electrical connection 38 may be formed by mating the electrical contacts 40 of the filter 4 with the electrical contacts 42 of the vehicle 16 through their mutual alignment during mounting of the filter 4 on the vehicle 16. The alignment of the electrical contacts 40, 42 may be aided by an alignment mechanism. With reference to FIGS. 4 and 5, the alignment mechanism may align the filter 4 relative to the vehicle 16 or portion thereof, so as to contact the electrical contacts 40 of the filter 4 to the electrical contacts 42 of the vehicle 16 and thereby form the electrical connection 38 between the filter 4 and the vehicle power source 8.

With reference to FIG. 4, the alignment mechanism includes a threaded female connector 44 on the filter 4, and a corresponding threaded male connector 46 on an oil filter mounting portion 48 of the vehicle 16. In FIG. 4, the electrical connection 38 is made by screwing the filter 4 onto the oil filter mounting portion 48 by engaging the threaded female connector 44 to the threaded male connector 46 and twisting the filter 4 to mount the filter 4 to the oil filter mounting portion 48. The electrical contacts 40 on the filter 4 (in the form of two cuboid protrusions) are thus brought into contact with the electrical contacts 42 (in the form of two annular protrusions) on the oil filter mounting portion 48 as shown.

With reference to FIG. 5, the alignment mechanism includes an air filter box 50 of the vehicle 16, and electrical contacts 42 of the vehicle 16 are arranged in the interior 52 of the air filter box 50. The interior 52 has a size and shape (e.g. rectangle) that correspond to the size and shape of the filter 4. The electrical connection 38 is made by inserting the filter 4 in the interior 52 of the air filter box 50, thereby bringing the electrical contacts 40 on the filter 4 into contact with the electrical contacts 42 in the air filter box 50 as shown.

The power source 8 is thereby in electrical communication with the conductive thread 20 through the mating of these electrical contacts 40, 42 and the formation of the electrical connection 38, and thus electric current from the power source 8 can be supplied to, and thus flow through, the conductive thread 20 through this electrical connection 38.

The invention is not limited to these alignment mechanisms or configurations for the electrical contacts 40, 42, and other alignment mechanisms and configurations for the electrical contacts can be used to form the electrical connection 38.

The sensor 12 is included to monitor various electrical phenomena resulting from the electric current flowing through the conductive thread 20. These electrical phenomena may be altered (e.g. in magnitude) by the buildup of impurities 6 in the filter medium 18 as explained in more detail herein. The amount of electric current provided by the power source 8 may be constant, so that a detected change in the electrical phenomena is a result of the impurities 6 collected in the filter medium 18. Thus a detected change in the electrical phenomena during use of the filter 4 may indicate a level of impurities 6 in the filter medium 18, i.e. a level of cleanliness of the filter 4. The change in the electrical phenomena is not particularly limited, as long as it can be detected by the sensor 12, and may include for example, an increase or decrease in a magnitude of the electrical phenomena, a change in the type of electrical phenomena induced by the electric current flowing through the conductive thread 20, or other change that can be detected by the sensor 12.

An electronic control unit (ECU) 54 of the vehicle 16 may be in communication with the sensor 12 and the indicator 14, and determine if the measured electrical phenomena exceed a predetermined threshold. If the predetermined threshold is exceeded, then the ECU 54 may cause the indicator 14 to produce the alert signal 10. The predetermined threshold may be determined based on an acceptable upper threshold amount of impurities 6 in the filter 4, above which the filter 4 should be replaced in the system 2 with a new filter 4. In an embodiment, the conductive thread 20 does not apply a charge to the impurities 6 for screening the impurities 6 from the fluid by electrostatic or other attraction to the filter material 18. That is, the filter 4 may operate to remove the impurities 6 from the fluid only by physical separation of the impurities 6 from the fluid, where the filter 4 separates the impurities 6 (which may be solid) from the fluid (liquids or gases) by including the filter medium 18 through which only the fluid can pass.

The sensor 12 may be external to the filter 4. As depicted in FIG. 4, the sensor 12 is arranged on the oil filter mounting portion 48. As depicted in FIG. 5, the sensor 12 is arranged in the interior 52 of the air filter box 5. Other arrangements of the sensor 12 with respect to the filter 4 can be used, including mounting the sensor 12 on the filter 4, so long as the sensor 12 is able to detect the various electrical phenomena resulting from the electric current flowing through the conductive thread 20, and communicate with the ECU 54.

The sensor 12 may be configured to detect a) a voltage of the electric current flowing through the conductive thread 20, b) an electromagnetic field produced by the electric current flowing through the conductive thread 20, c) an inductance of the conductive thread 20 produced by the electric current flowing through the conductive thread 20, d) a capacitance of the conductive thread 20 produced by the electric current flowing through the conductive thread 20; or e) combinations of a)-d) along with other electrical phenomena resulting from the electric current flowing through the conductive thread 20. The sensor 12 may detect a)-e) wirelessly or through an electrical connection with the conductive thread 20, optionally via the electrical connection 38.

In a non-limiting embodiment, the sensor 12 detects a) the voltage of the electric current flowing through the conductive thread 20. The voltage may be affected by impurities 6 in the filter 4. This may occur where the impurities 6 abrade the conductive thread 20, and thus decrease a cross-sectional area of the conductive thread 20 or abrading away a conductive material of the conductive thread 20, and thereby reduce its conductivity. A reduction in conductivity may reduce the detected voltage, thus indicating a level of impurities 6 in the filter 4. A change in voltage may also occur by the impurities 6 dissipating the electric current flowing through the conductive thread 20. This may occur if the impurities 6 are themselves conductive, and thus are able to draw electric current out of the conductive thread. A dissipation of the electric current may cause a reduction in the detected voltage.

In another non-limiting embodiment, the sensor 12 detects b) an electromagnetic field produced by the electric current flowing through the conductive thread 20. For this purpose, the sensor 12 may include a detector coil and the conductive thread 20 may include coils 30 to thereby form a transmitter coil. Electric current flowing through the coils 30 may induce an electromagnetic field, which may produce a corresponding electric current flowing through the detector coil of the sensor 12 by induction. Impurities in the filter 4 may affect the electromagnetic field by damping it or amplifying it. By measuring the amount of induced electric current flowing through the detector coil of the sensor 12, the sensor 12 is able to detect a level of impurities 6 in the filter 4.

In another non-limiting embodiment, the sensor 12 detects c) an inductance of the conductive thread 20 produced by the electric current flowing through the conductive thread 20. In this embodiment, the conductive thread 20 may include coils 30. When electric current is passed through the coils 30, this produces oscillation, which is a high frequency alternating electric current in the coils 30 that has a constantly changing electromagnetic field able to induce eddy currents in the impurities 6. The closer the impurities 6 are to the coils 30, and the greater their conductivity, the greater the induced eddy currents are in the impurities 6, and the more effect the impurities' 6 resulting opposing electromagnetic fields have on the magnitude and frequency of the oscillation in the coils 30. The magnitude of the oscillations is reduced as the load is increased in a non-magnetic impurities 6, e.g. dirt, because the induced field in the impurities 6 opposes the source induction field from the coils 30, lowering net inductive impedance and therefore simultaneously tuning the oscillation frequency of the coils 30 to be higher. But that magnitude of the oscillation is less affected if the impurities 6 are highly magnetically permeable material, like iron, as that high permeability increases the coil inductance, lowering the frequency of oscillation. The sensor 12 may measure the change in magnitude of the oscillation with an amplitude modulation detector. The sensor 12 may detect a change in the frequency of the oscillation, which can be accomplished with a frequency discriminator circuits, like a phase lock loop detector, to see in what direction and how much the frequency shifts. As such, the type (conductive or non-conductive) and amount of impurities 6 in the filter 4 can be determined. This type of detection distinction between impurities 6 that are conductive (e.g. metal particles) and non-conductive (e.g. dirt), can also be used as a diagnostic to determine if metal particles are being screened from oil in the vehicle 16, which may indicate a problem with the engine of the vehicle 16.

In another non-limiting embodiment, the sensor 12 detects d) the capacitance of the conductive thread 20 produced by the electric current flowing through the conductive thread 20. The capacitance may be affected by impurities 6 in the filter 4. This may occur where the impurities 6 increases the parasitic capacitance of the conductive thread 20 to ground, thereby reducing its capacitance and thus indicating a level of impurities 6 in the filter 4.

The ECU 54 may communicate with the sensor 12 and the indicator 14, and provide control instructions for operating the indicator 14. The ECU 54 may operate to determine the level of impurities 6 in the filter 4 based on the electrical phenomena resulting from the electric current flowing through the conductive thread 20 as measured by the sensor 12. The ECU 54 may compare these detected electrical phenomena or determined level of impurities 6 against a predetermined threshold value. If the predetermined threshold is exceeded, then the ECU 54 may control the indicator 14 to provide an indication (i.e. the alert signal 10) that the level of impurities in the filter 4 is above the predetermined threshold.

The system 2 may include an indicator 14, which may be controlled by the ECU 54 to provide an indication (i.e. the alert signal 10) that the level of impurities in the filter 4 is above a predetermined threshold. The indicator 14 may include a light source that emits light as the signal 10 to an occupant of the vehicle 16; a wireless transmitter that emits a wireless electronic communication as the signal 10 to a receiver 56 that is remote and external to the system 2 and/or to the vehicle 16; other components that provide the signal 10 that the level of impurities in the filter 4 is above a predetermined threshold; or combinations thereof.

As depicted in FIGS. 2-3, the indicator 14 provides the alert signal 10 in a wireless manner, to a receiver 56 in the form of a computer that is remote from the system 2 and vehicle 16. Where the vehicle 16 is an autonomous vehicle, the computer may be monitored by an owner of the vehicle 16, or by a service provider of the vehicle 16. When the alert signal 10 is received, the owner or service provider may then remove the filter 4 from the vehicle 16 and place a new filter in the vehicle 16. For autonomous vehicles, this may be advantageous because the owner or service provider may not have daily access to the vehicle 16 to monitor the filter 4 for the level of impurities 6. Additionally, the alert signal 10 may be generated independently from the number of miles the vehicle 16 has driven, and instead is generated based on the level of impurities 6 in the filter 4. This alert signal 10 may therefore represent a more-accurate way to determine that the filter 4 requires exchange with a new clean filter, and thus can be used in other applications such as building HVAC systems, or water treatment facilities, or non-autonomous driver-operated vehicles. Rather than only including an indication that the level of impurities 6 in the filter 4 exceed the predetermined threshold, the signal 10 may also include additional information including the current level of impurities 6 in the filter 4 (whether or not they exceed the predetermined threshold), and this additional information may be sent in the signal 10 continuously or periodically, and before and/or after the level of impurities 6 in the filter 4 exceed the predetermined threshold.

Figure 6:
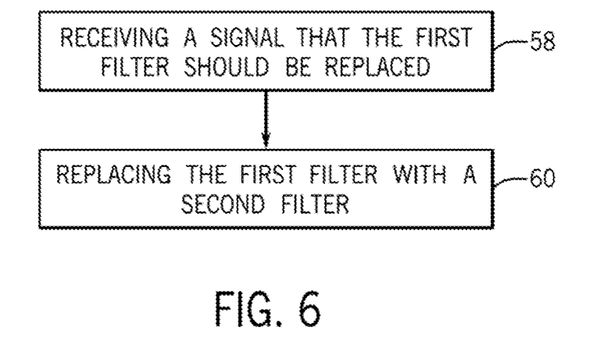
FIG. 6 is a schematic block diagram illustrating a method according to the present subject matter.

With reference to FIG. 6, a method of changing a first filter 4 in a system 2 with a second filter is provided. The method includes at 58, receiving a signal 10 from the system 2 that the first filter 4 should be replaced, and at 60, replacing the first filter 4 with a second filter. The second filter can be identical to or different from the first filter. As described herein, the system 2 includes a power source 8 and a sensor 12. The first filter 4 includes filter medium 18 that screens out impurities 6 from a fluid, and a conductive thread 20 contacting the filter medium 18 and electrically connected to the power source 8. The power source 8 provides electric current flowing through the conductive thread 20. The sensor 12 detects electrical phenomena produced by the electric current flowing through the conductive thread 20. The impurities 6 in the filter 4 cause a change in the electrical phenomena, which change indicates the level of impurities 6 in the filter 4. The signal 10 is generated in response to the change exceeding a predetermined threshold.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A filter including:
   a filter medium configured to screen out impurities from a fluid, and
   a conductive thread contacting the filter medium, the conductive thread being configured to have electric current flowing therethrough;
   wherein electrical phenomena is produced by the electric current flowing through the conductive thread; and
   wherein when the impurities screened from the fluid are in the filter medium, and when the electrical phenomena is produced, then the impurities in the filter medium cause a change in the electrical phenomena, which the change indicates a level of the impurities in the filter medium.

2. The filter according to claim 1, wherein:
   the electrical phenomena include a voltage of the electric current flowing through the conductive thread; and
   the change in the electrical phenomena include a reduction in the voltage.

3. The filter according to claim 2, wherein:
   the filter is an air filter;
   the fluid is air;
   the air filter removes the impurities from the air; and
   the impurities abrade at least a portion of the conductive thread, or the impurities dissipate the electric current flowing through the conductive thread causing the reduction in the voltage.

4. The filter according to claim 1, wherein:
   the electrical phenomena includes an electromagnetic field produced by the electric current flowing through the conductive thread, an inductance of the conductive thread, a capacitance of the conductive thread, or combinations thereof; and
   the change in the electrical phenomena includes a change in the electromagnetic field, a change in the inductance, a change in the capacitance, or combinations thereof.

5. The filter according to claim 4, wherein:
   the filter is an oil filter;
   the fluid is oil; and
   the oil filter removes the impurities from the oil.

6. The filter according to claim 1, wherein the filter medium is a sheet like structure having a Z-fold.

7. A system comprising:
   a power source;
   a filter including a filter medium configured to screen out impurities from a fluid, and a conductive thread electrically connected to the power source, the conductive thread configured to have electric current flowing therethrough; and
   a sensor;
   wherein the power source provides the electric current flowing through the conductive thread,
   wherein electrical phenomena is produced by the electric current flowing through the conductive thread,
   wherein the sensor is configured to detect the electrical phenomena, and
   wherein when the impurities screened from the fluid are in the filter medium, and when the electrical phenomena is produced, then the impurities in the filter medium cause a change in the electrical phenomena, which the change indicates a level of the impurities in the filter medium.

8. The system according to claim 7, further including an indicator in communication with the sensor, wherein the indicator provides an alert that the filter should be replaced when the level of the impurities exceeds a predetermined threshold.

9. The system according to claim 8, wherein the alert is a wireless electronic communication transmitted to a receiver external to the system.

10. The system according to claim 7, further including a vehicle, wherein:
the power source is a vehicle power source of the vehicle;
the filter is a vehicle filter of the vehicle;
the sensor is a vehicle sensor arranged in the vehicle;
the vehicle filter further includes electrical contacts for making an electrical connection to the vehicle power source;
the system further includes an alignment mechanism aligning the filter relative to the vehicle so as to make the electrical connection between the electrical contacts and the vehicle power source.

11. The system according to claim 7, wherein the power source and the sensor are external to the filter.

12. The system according to claim 7, wherein:
the electrical phenomena include a voltage of the electric current flowing through the conductive thread; and
the change in the electrical phenomena include a reduction in the voltage.

13. The system according to claim 12, wherein:
the filter is an air filter;
the fluid is air;
the air filter removes the impurities from the air; and
the impurities abrade at least a portion of the conductive thread, or the impurities dissipate the electric current flowing through the conductive thread causing the reduction in the voltage.

14. The system according to claim 7, wherein:
the electrical phenomena includes an electromagnetic field produced by the electric current flowing through the conductive thread, an inductance of the conductive thread, a capacitance of the conductive thread, or combinations thereof; and
the change in the electrical phenomena includes a change in the electromagnetic field, a change in the inductance, a change in the capacitance, or combinations thereof.

15. The system according to claim 14, wherein:
the filter is an oil filter;
the fluid is oil; and
the oil filter removes the impurities from the oil.

* * * * *